July 7, 1959 O. M. KENDON 2,894,109
COMMERCIAL WATER HEATER
Filed Aug. 22, 1957 3 Sheets-Sheet 1

INVENTOR
OWEN MURRAY KENDON
BY
Watson, Cole, Grindle & Watson
ATTORNEYS

July 7, 1959　　　O. M. KENDON　　　2,894,109
COMMERCIAL WATER HEATER

Filed Aug. 22, 1957　　　　　　3 Sheets-Sheet 2

INVENTOR
OWEN MURRAY KENDON

BY
Watson, Cole, Grindle & Watson
ATTORNEYS

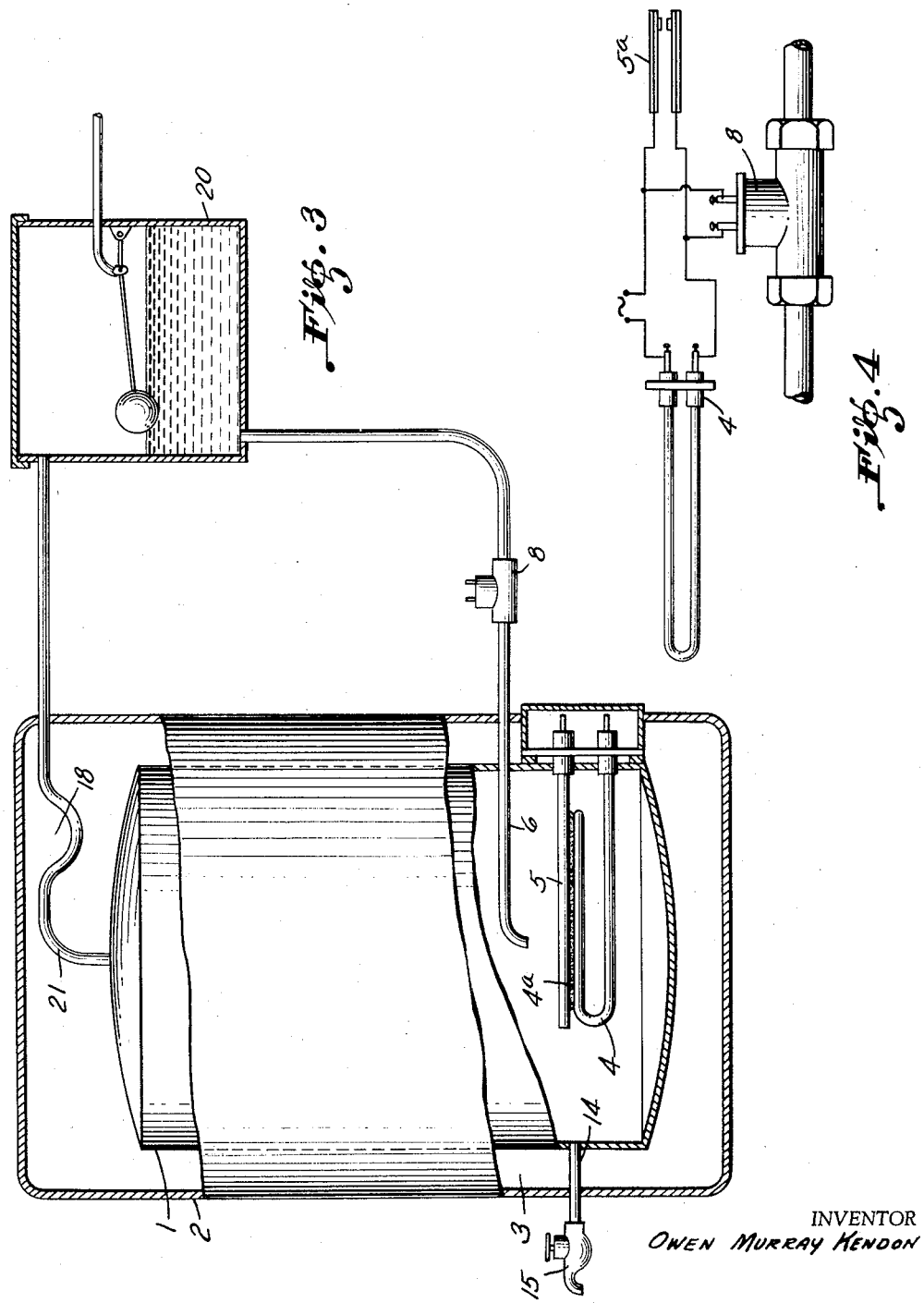

United States Patent Office 2,894,109
Patented July 7, 1959

2,894,109

COMMERCIAL WATER HEATER

Owen Murray Kendon, Remuera, Auckland, New Zealand, assignor to Kendon Developments Limited, Auckland, New Zealand Application August 22, 1957, Serial No. 679,691

Claims priority, application New Zealand August 22, 1956

10 Claims. (Cl. 219—38)

This invention relates to water heating and/or hot water supplying apparatus having the stored water temperature controlled thermostatically.

It is, of course, desirable, that when a quantity of water has been drawn off from such apparatus, it should be replaced automatically, but without unduly cooling the contents of the storage container. However, with thermostatic apparatus controlling the water temperature above or only slightly below its atmospheric boiling point, variation in the switch-off point of the thermostat controlling such temperature, or release of the pressure by leaving the outlet tap turned on, may result in water continuing to boil away until the heating means is exposed.

It may so happen that if the heating means is exposed in either of these ways it may overheat and be damaged. Also, even if the outlet tap is turned off, once the water level has fallen to the level of the bottom of the vent pipe, pressure will no longer be retained. It is therefore an object of the invention to protect the heating means under such conditions, and to make provision for the desired pressure (if above atmospheric) to be built up again automatically as soon as the outlet tap is turned off.

It is, further, an object of the present invention to provide a construction in which the provision of these desirable features is substantially achieved in a simple, yet effective, manner.

The invention consists in water heating and/or hot water supplying apparatus comprising a container, heating means, thermostatic control means, water inlet means to said container having an electro-magnetically actuable valve associated therewith, and controllable outlet means from the container, wherein at least a part of said thermostatic control means and said heating means are connected to each other by thermally conducting material so that heat will be conducted to said thermostatic control means even in the absence of water, the arrangement being such that the thermostatic control means actuates said electro-magentically actuable valve when the temperature rises to a predetermined value whether or not the heating means and thermostatic control means are wholly or partly immersed in water, whereafter water will be admitted to the container, and such that when the temperature falls below a predetermined value the admission of water is prevented or reduced to a low rate.

It will be clear from the foregoing that the invention envisions a construction in which damage to the apparatus and/or fire risk through water boiling away is minimized by (a) the provision of an electro-magnetically actuable valve controlled by thermostatic means so that when the temperature rises above a set value cooler water is admitted, and (b) the joining of the heating means and the thermostatic control means to each other so that, in the event of the water boiling away the thermostat will still control the heating means to control the temperature.

In the case of apparatus designed to hold water at a temperature above atmospheric boiling point and in which an expansion pipe, taken to a height sufficient to retain the pressure, is provided, the expansion pipe preferably enters the container at or passes to a level lower than the top of the heating means. Heating may be provided electrically or in any other suitable way.

In order that the invention may be fully understood it will now be further described with reference to the examples illustrated in the accompanying drawings in which:

Fig. 3 is a side elevation partly in section showing a third embodiment of apparatus in accordance with the invention, and Fig. 4 is a diagrammatic view showing the electrical circuit of the foregoing embodiments.

Figure 1:
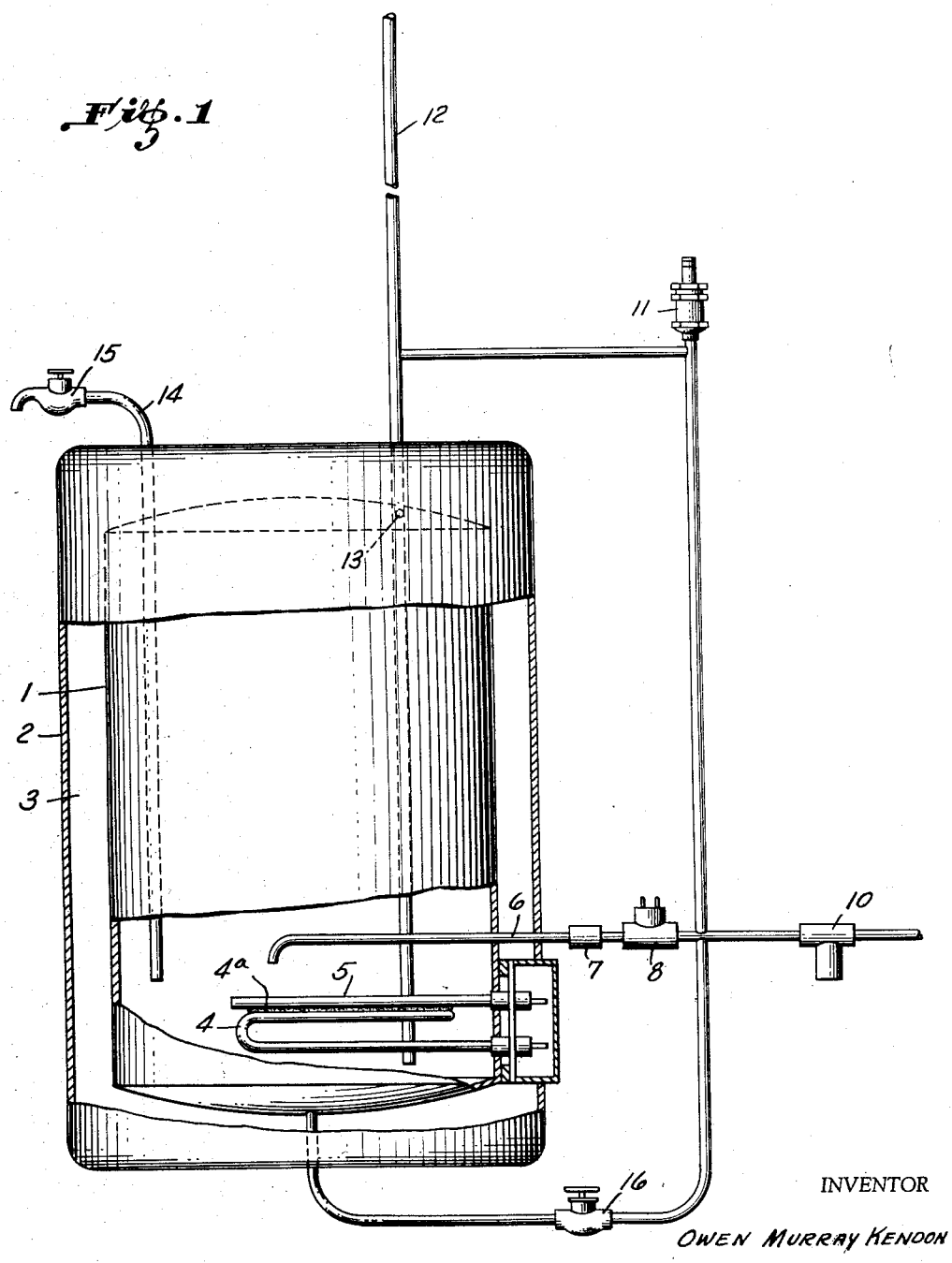
Figure 1 is a side elevation partly in section showing the apparatus in accordance with the invention.

The same or similar parts are denoted by the same reference numerals throughout the drawings. Fig. 1 shows a cylindrical water container 1 mounted in a sheet metal casing or the like 2 containing insulating material in the space 3. An electric heating element 4 is securely attached to a casing or pocket 5 containing the sensitive portion of a thermostatic control means in the form of a thermostatic switch 5a, Fig. 4. The attachment is made by brazing 4a or by any other known means which will provide a substantial path having good properties of thermal conduction. An inlet pipe 6 which may optionally include a one way check valve 7 to prevent return flow of water, enters the side of the container 1 at a level just above that of the casing 5 and extends horizontally inwardly by half the diameter of the container, so that at whatever angle it is placed relative to the thermostat 5 water entering through it will fall onto the pocket 5 and quickly affect the thermostat disposed therein. The end of the pipe 6 may be turned downwardly as shown in Fig. 1 of the drawings or, alternatively, the pipe may be straight throughout its length, in which case the end of the pipe may be closed and a hole formed in its under side in such a position that water flowing through the hole will be directed onto the thermostat pocket 5. Electromagnetically actuable valve means comprising an electric solenoid valve 8 is connected to a water supply which is controlled at the desired water pressure either by a header tank (not shown) or a pressure reducing valve 10 or both if desired. A back-pressure opening water control valve 11 (as described in United States Patent No. 2,786,126) is set to close at, for example, 2 lbs., per square inch above atmospheric pressure is also connected to the water supply and is connected into an expansion or vent pipe 12 which is continued upwardly to a height of, for example, 12 to 16 ft., and downwardly into the container to a level below the top of the heating means. The control valve 11 is connected in such a way that it can bypass the solenoid valve 8. At the top of the inside of the container 1 an air-bleeding means in the form of a small hole 13 is provided in the expansion or outlet pipe 12 (as described in the said United States Patent No. 2,786,126). An outlet pipe 14 is provided, which is fed with water at a level a little above the thermostat level, and which may emerge from the container 1 in any suitable direction. The pipe 14 is connected to an outlet tap 15 or to a number of taps as desired.

The electric wiring of the heating element 4, thermostat switch 5a, and solenoid valve 8 are shown in Fig. 4.

The phase wire is connected to one terminal of the thermostat switch 5a, and the neutral wire is connected to one terminal of the heating element 4. A wire connects the other terminal of the thermostat switch 5a to the other terminal of the heating element 4. Wires coming from each end of the coil of the solenoid valve 8 are also connected one to each terminal of the thermostat switch 5a, placing the solenoid 8 in parallel with the switch. As a result of this arrangement, when the thermostat switch 5a is closed, full power is supplied to the heating element 4 and the solenoid coil of the valve 8 is not energized. When the thermostat switch 5a is open, both the coil and heating element are in series, and therefore the coil is substantially fully energized, being of much higher resistance than the heating element, the small current required to energize the coil passing through the heating element with negligible heating effect. The valve 8 is arranged so that, with the above wiring arrangement, when the heating element 4 is switched on, the solenoid valve 8 is closed, and when the heating element 4 has the coil in series with it and consequently is receiving very little current, the solenoid valve 8 is open.

A bypass valve 16 may, if desired, Fig. 1, be provided between the container 1 and the water supply pipe which valve 16 is helpful for draining purpose, and can be used for the initial filling of the container.

The operation of the apparatus will now be described:

When the bypass valve 16 is opened, the container will fill with water, air finding its way to the atmosphere through the hole 13 and the expansion or outlet pipe 12. Electric power is switched on and, because the thermostatic switch 5a is closed, the heating element 4 will raise the water temperature to the point at which the thermostat is set (e.g. 225 deg. F.), when the thermostat switch 5a will open, energizing the coil of the solenoid valve 8 and effectively switching off the heating element 4.

Pressure is now retained by water in the expansion pipe 12 and the closed outlet tap or taps 15 connected to the outlet pipe 14. At this stage the pressure in the container 1 will be at or above that of the controlled water supply, the pressure of which is set higher than the maximum water vapor pressure of, for example, approximately 3½ lbs. to the square inch above atmospheric pressure which can exist in the container 1. The outlet tap 15 is opened and a quantity of water drawn off. The level of the water in the expansion or outlet pipe 12 will drop to that consistent with the vapor pressure in the container 1 and the water supply, being at a higher pressure, will immediately begin to feed into the container 1 through the solenoid valve 8 and the control valve 11. Cool water falling from the end of the inlet pipe 6 will immediately cool the thermostat 5 causing the thermostat switch 5a to close. The solenoid valve 8 being de-energized will close, cutting off the supply of water through it and its inlet pipe 6 (although water supply will still continue at this stage through the control valve 11) and the heating element 4 will be energized. Some mixing will take place, so that the temperature drop caused by cool water entering through the control valve 11 will affect the thermostat 5 and keep the heating element 4 switched on. However, the water temperature will not fall below a desired minimum value, because the control valve 11 is set to close before such value is reached and the inflow of cool water is reduced to a very low rate by the control valve 11 closing. Filling through the control valve 11 will continue, with the heating element 4 remaining energized until the container 1 is again full, at which time filling will cease and the water level will rise in the expansion pipe 12 until the water supply pressure is balanced. The water temperature will then rise until the thermostat 5a switches the heating element 4 off and the solenoid valve 8 opens.

It has been found that the slow flow of cool water through the pipe 12 from the control valve 11 is sufficient to keep the temperature of the pipe adjacent to the hole 13 below a value at which evaporation is caused by the surface of the pipe 12. This is an important feature since it prevents any substantial deposition of solids scaling from taking place in this area and thus ensures that the hole 13 does not become covered. A further advantage of connecting the pipe from the control valve 11 to the expansion or outlet pipe 12 is that if very hot water from the container 1 finds its way into the upper part of the expansion or outlet pipe 12, which water could reduce the pressure retaining effect by starting to boil therein, cool water from the control valve 11 will flow into the pipe 12 and stop the boiling.

If the outlet tap 15 is left on, water will be drawn off until water in the container 1 is level with that point at which it feeds into the outlet pipe 14, then steam will emerge from the outlet tap 15 and the temperature of the stored water will drop to approximately atmospheric boiling point. As a result both the control valve 11 and the solenoid valve 8 will remain closed and the water level will continue to fall until a level a little below the top of the heating element 4 is reached. Heat transfer to the thermostat 5 will then take place through the heat conducting material 4a connecting the element 4 and the thermostat 5, and as soon as such heat transfer raises the thermostat temperature to the switch-off point, the solenoid coil will be energized and the solenoid valve 8 will open, and supply water will flow into the container, increasing the water level and cooling the thermostat and the element. This alternating condition will then continue indefinitely without the water level falling low enough for steam to issue from the expansion or outlet pipe 12. As soon as the outlet tap 15 is closed again, pressure will be retained and will build up until normal filling operation again comes into action. The container 1 will then fill to the top.

If the thermostat setting is altered or itself varies upwards to the point at which the vapor pressure in the container balances the maximum head of water possible in the expansion or outlet pipe 12, water will begin to flow out of the expansion or outlet pipe 12. As a result all the stored water may be ejected until the water level in the container is below the heating element level. Heat transfer to the thermostat through the heat conducting connection material 4a will raise the thermostat temperature to its switch-off point, when the solenoid valve 8 will open, and supply water will enter the cylinder and raise the water level a small amount. The process will be repeated until the water level is sufficient to eliminate the direct heat transfer switching of the thermostat, when normal filling operation will come into action. The container will then fill and service will be given during filling, although the frequent discharge of water from the expansion or outlet pipe 12 will give warning that the thermostat needs resetting.

The above construction can be modified in several ways, for example the water control valve 11 constructed according to United States Patent No. 2,786,126 can be omitted and the water supplied through the electromagnetically actuatable valve. In such a case, it is preferable that an inlet pipe be taken into the container 1 just above the thermostat and heater combination, and in addition a connection is made from this inlet pipe to the expansion or outlet pipe 12 in order to provide for the cooling of the pipe 12 and hole 13 as above described. In this construction a non-return valve must be inserted between the inlet pipe and the said connection to the expansion pipe.

The water pressure in the container can be controlled either by a header tank, by a pressure reducing valve, or, when the control valve 11 is omitted, by a pressure switch arranged to break the circuit through the solenoid coil when the desired maximum water pressure is reached.

Figure 2:
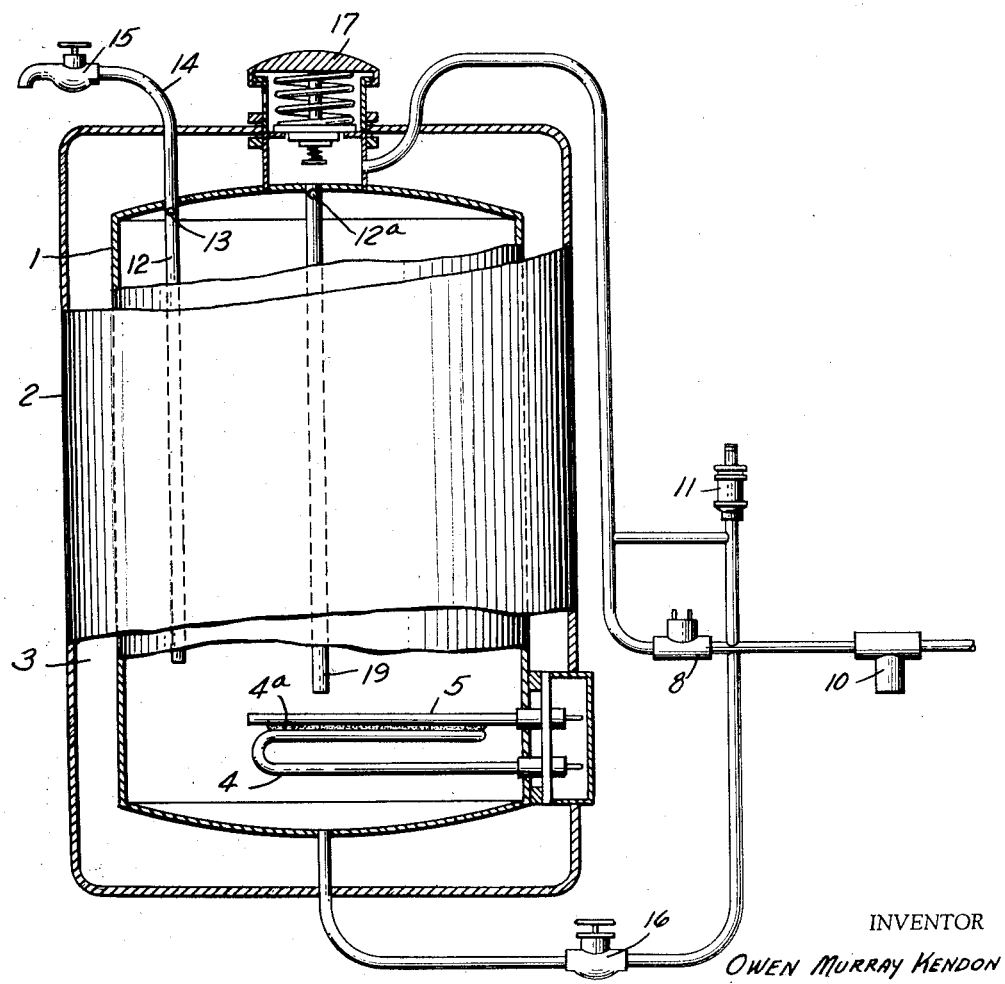
Fig. 2 is a side elevation partly in section showing a second embodiment having a different form of pressure retaining means.

In the alternative construction shown in Fig. 2 in which the expansion pipe is replaced by pressure retaining means comprising a spring loaded or weighted valve 17 set to open a little above the desired maximum pressure, which in this case may be the pressure of the main water supply, the electro-magnetically actuatable valve 8 and the control valve 11 are connected in parallel between the water supply and the pipe 19 at a point or points below the valve 17 so that water passing through the inlet pipe 19 tends to keep the temperature of the valve 17 below that at which substantial scaling can occur. To facilitate draining and initial filling a bypass valve 16 may again be provided as above. Preferably the pipe 19 is provided with a secondary air bleed hole 12a inside and at or near the top of the container 1 for initial filling with the valve 17 raised from its seat and to permit the formation of a cushion of gases in the upper part of the pipe 19 below valve 17 thereby tending to eliminate flow of water from valve 17 through expansion. The diameter of this hole 12a is not critical and may be up to ¼ inch or more. Preferably the main air bleed means consists of a small hole 13.

Fig. 3 shows a construction in which the thermostat 5 is set for a little below atmospheric boiling point. In this case the water pressure of the supply need not be higher than just sufficient to fill the container 1 and therefore the header tank 20 is arranged with its float controlled level just below the top of the container 1. The expansion pipe 21 rises only slightly above the level of the top of the container 1. The expansion pipe 21 may, if desired, be continued downwardly into the container 1. If it is, an air bleed means 13 as described in United States Patent No. 2,786,126 must be provided. In this construction, an electro-magnetically actuable valve 8 only is provided, and delivery is normally effected by gravity. The expansion pipe 21 is connected to the header tank 20 and includes an evaporation trap 18 which is preferably in the form of a U-shaped pipe. The trap 18 collects condensed water vapor from the container 1 and thus prevents low-pressure water vapor from leaving the container 1. The amount of water collected in the trap 18 will not be sufficient to hinder unduly the passage of air into the container 1 in the event of the stored water cooling from a fairly high temperature while the container 1 is only partly filled. In this construction the inlet pipe 6 does not necessarily need to be constructed so as to feed water directly on to the thermostat stem.

Instead of using a thermostat having a single pair of contacts it is possible to use a thermostat or contact thermometer (having two switches) one of which operates at a lower temperature than the other. Such thermostatic control means can be constituted for example, by a mercury type thermometer, the mercury of which makes contact with three contacts, the upper pair of which are placed one below the other in the path of the mercury. The circuit is completed through the mercury and, since normally the current which can be passed through such construction is normally light, it may be necessary to use a relay to control either the heating element or both such heating elements and the electro-magnetically actuatable valve.

Alternatively, the heat sensitive portion of the thermostat may comprise a bulb partly filled with fluid which exerts a suitable vapor pressure on being heated. This heat sensitive portion is connected to a pressure sensitive means, preferably comprising a metal bellows type diaphragm so that when the heat raises the vapor pressure of the fluid in the heat sensitive portion, the diaphragm is moved by the pressure generated therein. Mounted on the diaphragm is an operating rod which passes through a bar mounted on two standards associated with the mounting means on which the heating element and the thermostat are both mounted. A spring is arranged between the bar and a nut threaded on the operating rod so that the spring exerts a pressure tending to resist movement of the operating rod away from the heat sensitive element. The operating rod operates a lever pivoted to the bar or any suitable means adjacent thereto and two micro-switches are mounted in such a position that they can be operated by the lever, the switches being arranged relative to the lever so that one switch operates at a lower temperature than the other, being closed before the other switch, and being opened after the other switch, although it will be understood that the closing and opening sequence may be reversed or modified, depending on the type of switch used. With such an arrangement the heating element is connected to a source of current through that switch which is operated by the thermostat at the higher temperature, so that the thermostat switches off the heating element when the temperature rises above the higher predetermined temperature. The electro-magnetically actuable valve is connected to that switch which is operated by the thermostat at the lower temperature, in a manner such that the valve is closed when the temperature is below the setting of said thermostatic switch and the valve is opened when the temperature is above this predetermined temperature. It will be appreciated that whether the switch controlling the solenoid valve opens or closes at the specified temperature, depends on whether or not the valve is open or closed under energization. Valves constructed to be closed when not energized are more usually met with commercially and are therefore cheaper, and this influences the type of switch selected, i.e. a switch which makes its contacts when the operating lever operates the switch.

If gas or liquid fuel is used, it is preferable that one thermostat be provided to control the fuel supply and another electric thermostat provided to control the solenoid valve. In this case the thermostat is preferably connected by thermally conducting material to that part of the container which is heated by the flame.

Having thus described the invention, what is claimed as new and desired to be secured by Letters Patent is:

1. Water heating and hot water supplying apparatus comprising a container, heating means, thermostatic control means, water inlet means connected to said container having an electro-magnetically actuable valve associated therewith, and controllable outlet means from the container, at least a part of said thermostatic control means and said heating means being connected to each other by thermally conducting material so that heat will be conducted to said thermostatic control means at all times and when there is absence of water, the thermostatic control means actuating said electro-magnetically actuable valve when the temperature rises to a predetermined value with the heating means and thermostatic control means being at least partly immersed in water, whereafter water will be admitted to the container, and when the temperature falls below a predetermined value the admission of water is prevented or reduced to a low rate.

2. Water heating apparatus according to claim 1, in which the inlet means comprises a pipe which opens into the container just above the level of the thermostatic control means, and the pipe includes a one-way check valve.

3. Water heating apparatus according to claim 1, in which the electro-magnetically actuatable valve is in the form of a solenoid-operated valve to be closed when not energized.

4. Water heating apparatus according to claim 1, in which the container is provided with pressure retaining means in addition to the controllable outlet means, the pressure retaining means comprising a spring-loaded valve set to open at a pressure a little above the desired maximum in said container.

5. Water heating apparatus according to claim 1, in which the container is provided with pressure retaining means in addition to the controllable outlet means, and in which air bleeding means is provided for the container.

6. Water heating apparatus according to claim 1, in which a back-pressure opening water control valve is provided to bypass the electro-magnetically actuable valve.

7. Water heating apparatus according to claim 1, in which the thermostatic control means is in the form of a thermostatic electric switch and the heating means is in the form of an electric heating element.

8. Water heating apparatus according to claim 1, in which the thermostatic control means is in the form of a thermostatic electric switch and the heating means is in the form of an electric heating element, the heating element and the electro-magnetically actuatable valve being connected in series with a source of current, and in which the switch is connected in parallel with the valve.

9. Water heating apparatus according to claim 1, in which the thermostatic control means is in the form of a bulb connected to a bellows type diaphragm, said bulb containing a fluid which will exert a vapor pressure when it is heated, and wherein a pair of switches are mounted for successive operation by a lever which is itself moved by said diaphragm.

10. Water heating apparatus according to claim 1, in which the pressure retaining means comprises a pressure relief valve with air inlet means.

References Cited in the file of this patent

UNITED STATES PATENTS

| | | |
|---|---|---|
| 450,896 | Sims | Apr. 21, 1891 |
| 1,450,833 | Bergeon | Apr. 3, 1923 |
| 1,657,144 | Armstrong | Jan. 24, 1928 |
| 1,726,789 | Wuthrich | Sept. 3, 1929 |
| 1,737,834 | Eaton | Dec. 3, 1929 |
| 1,930,551 | Blashfield | Oct. 17, 1933 |
| 1,959,933 | Simsohn | May 22, 1934 |
| 2,176,539 | Moore | Oct. 17, 1939 |
| 2,355,975 | Henrici | Aug. 15, 1944 |
| 2,616,023 | Meyer | Oct. 28, 1952 |
| 2,813,965 | Arnett | Nov. 19, 1957 |

OTHER REFERENCES

Brayman: "Tech Eng'g. News," pages 343–345 and 364, May 1946.